(12) United States Patent
Kreinest

(10) Patent No.: US 10,624,454 B1
(45) Date of Patent: Apr. 21, 2020

(54) MOBILE ARTICULATING ROD HOLDER

(71) Applicant: Michael Kreinest, Jacksonville, FL (US)

(72) Inventor: Michael Kreinest, Jacksonville, FL (US)

( * ) Notice: Subject to any disclaimer, the term of this patent is extended or adjusted under 35 U.S.C. 154(b) by 0 days.

(21) Appl. No.: 16/570,703

(22) Filed: Sep. 13, 2019

(51) Int. Cl.
*A47B 81/00* (2006.01)
*B62B 3/04* (2006.01)

(52) U.S. Cl.
CPC .............. *A47B 81/005* (2013.01); *B62B 3/04* (2013.01); *B62B 2202/402* (2013.01)

(58) Field of Classification Search
CPC .......... B62B 3/04; B62B 3/102; B62B 1/262; B62B 2202/402; B62B 2202/404; B62B 3/02; B62B 3/005; A47B 81/005; A47B 81/00; A47K 97/10
USPC ..... 211/70.8, 70, 70.2, 60.1, 85.8; 280/79.2, 280/79.3, 47.34, 47.35, 79.7; 43/21.2, 43/54.1
See application file for complete search history.

(56) References Cited

U.S. PATENT DOCUMENTS

| | | | | |
|---|---|---|---|---|
| 2,761,691 A | * | 9/1956 | George | B62B 1/262 280/47.19 |
| 4,355,818 A | * | 10/1982 | Watts | A01K 97/22 280/654 |
| 5,159,777 A | * | 11/1992 | Gonzalez | A01K 97/08 280/47.19 |
| 5,203,815 A | * | 4/1993 | Miller | A01K 97/08 211/149 |
| D341,238 S | * | 11/1993 | Sloan, III | 280/47.19 |
| 5,333,885 A | * | 8/1994 | Pullman | B62B 1/10 273/285 |
| D357,783 S | * | 4/1995 | Jones | D34/24 |
| 5,438,789 A | * | 8/1995 | Emory | A01K 97/10 248/514 |
| 5,566,960 A | * | 10/1996 | McCrory | B62B 3/10 280/47.35 |
| 5,611,561 A | * | 3/1997 | Dale, II | B62B 1/12 280/47.19 |
| 5,715,952 A | * | 2/1998 | Chichetti | A01K 97/10 211/70.8 |
| 5,806,827 A | * | 9/1998 | Gilmore | A01K 97/10 248/534 |
| 5,813,164 A | * | 9/1998 | Liberto | A01K 97/10 43/21.2 |
| 6,082,757 A | * | 7/2000 | Lin | A01K 97/22 16/429 |
| 6,264,216 B1 | * | 7/2001 | Wilson | B62B 1/00 280/30 |
| 6,467,779 B1 | * | 10/2002 | Mills | A01K 97/22 280/47.26 |

(Continued)

*Primary Examiner* — Jonathan Liu
*Assistant Examiner* — Devin K Barnett
(74) *Attorney, Agent, or Firm* — Lawrence J. Gibney, Jr.

(57) ABSTRACT

A plurality of fishing rods are placed in this device, and through the device, will allow compact storage of the plurality of fishing rods, easy transport in and out of vehicles, and over many different surfaces, saving time and reducing the chance of damage to the fishing rods and reels. A slider bar that extends from one end of the frame to the other secures a plurality of rod holders. If the user wishes to tilt the rods, the user pulls backward on the slider bar lever and the rods will tilt simultaneously in the same direction.

2 Claims, 4 Drawing Sheets

(56) References Cited

U.S. PATENT DOCUMENTS

| | | | | |
|---|---|---|---|---|
| 6,530,170 B1* | 3/2003 | Sweeney | A01K 97/10 | 211/70.8 |
| 6,883,267 B1* | 4/2005 | Pruitt | A01K 97/06 | 280/47.19 |
| 6,962,354 B1* | 11/2005 | Miller | A01K 97/08 | 280/47.26 |
| 7,017,940 B2* | 3/2006 | Hatfull | B62B 1/208 | 280/652 |
| 7,320,470 B1* | 1/2008 | Butera | A01K 97/08 | 280/47.18 |
| 7,384,051 B1* | 6/2008 | Haire | A01K 97/05 | 280/47.34 |
| D661,451 S * | 6/2012 | Armstrong, Sr. | D34/17 | |
| D671,291 S * | 11/2012 | Spann | D34/14 | |
| 8,348,286 B2* | 1/2013 | Arakawa | B62B 1/262 | 280/47.19 |
| 8,746,377 B1* | 6/2014 | Dunbar | B62B 5/0003 | 180/19.2 |
| 8,746,469 B1* | 6/2014 | De La Torre | B60R 9/08 | 211/70.8 |
| 9,282,797 B1* | 3/2016 | Soto | A45C 13/30 | |
| 9,616,909 B1* | 4/2017 | Abul | B62B 3/10 | |
| 9,861,087 B1* | 1/2018 | Arrazola | A01K 97/10 | |
| 9,902,416 B1* | 2/2018 | Dockery | B62B 3/10 | |
| 9,986,827 B1* | 6/2018 | Long | A47B 81/005 | |
| 10,021,866 B2 | 7/2018 | Arrazola et al. | | |
| 10,040,470 B1* | 8/2018 | Horowitz | B62B 3/102 | |
| 10,081,380 B2* | 9/2018 | Fitzwater | B62B 3/022 | |
| 10,375,945 B2* | 8/2019 | Potts | A01K 97/10 | |
| 10,376,052 B1* | 8/2019 | Bartley | A47B 81/005 | |
| 2002/0070517 A1* | 6/2002 | Ramsey | A01K 97/22 | 280/47.19 |
| 2007/0044367 A1* | 3/2007 | Slatter | A01K 97/10 | 43/21.2 |
| 2010/0059950 A1* | 3/2010 | Coghill, Jr. | B62B 1/14 | 280/47.26 |
| 2010/0108626 A1* | 5/2010 | Sorensen | A01K 97/08 | 211/70.8 |
| 2011/0179692 A1* | 7/2011 | McKnight | A01K 97/08 | 43/21.2 |
| 2013/0186845 A1* | 7/2013 | Harris | A47B 81/005 | 211/70.8 |
| 2013/0200021 A1* | 8/2013 | Dufty | A47F 7/0021 | 211/70.8 |
| 2013/0333268 A1* | 12/2013 | Henry, Jr. | A01K 97/08 | 43/4.5 |
| 2014/0110363 A1* | 4/2014 | Brown | A47F 7/0021 | 211/70.8 |
| 2014/0263113 A1* | 9/2014 | Hall, II | A47B 81/005 | 211/70.8 |
| 2014/0346206 A1* | 11/2014 | McKnight | A01K 97/08 | 224/404 |
| 2016/0045024 A1* | 2/2016 | Roberts | A47B 81/005 | 248/512 |
| 2016/0082997 A1* | 3/2016 | Horowitz | B62B 3/025 | 280/651 |

\* cited by examiner

MOBILE ARTICULATING ROD HOLDER

FIELD OF THE INVENTION

This relates to the storage and transport of fishing tackle and fishing rods. Fishing rods are expensive and difficult to transport because of their bulk, length, quantity required for typical fishing excursions and fragility. The process of transporting, cleaning and storing fishing rods requires individual handling of each rod which is time consuming and increases the likelihood of damaging the rods, especially the delicate eyelets and reel components.

This device allows a person to store multiple fishing rods in a small space, then easily tilt and transport all rods simultaneously from a storage area, through doorways, down stairs and in and out of vehicles without removing the rods from the device. The device allows a person to maximize limited storage space, protect equipment and simplify transportation.

PRIOR ART

There are other prior art references that claim tiltable fishing rod holders. A representative example of this type of device can be found at Arrazola, U.S. Pat. No. 10,021,866. The Arrazola reference uses a pair of rod holders that are positioned opposite each other on a frame. The pair of holders stow the rods but then can tilt so that clearances of garages or other common storage areas can be respected. In this reference, the rods tilt towards each other; the rods in Arrazola may be offset to minimize the risk of damage to the other rods but this risk is not eliminated. If the rods are tilted toward each other the rods may contact each other and damage the rods themselves. Additionally, this type of device will not allow the rods to be transported safely from garage to truck and truck to boat and vice versa. The current application does allow the ease of transport of multiple rods.

BRIEF SUMMARY OF THE INVENTION

This is a tiltable mobile articulating rod holder. The holder can stow multiple rods in a minimum space. The rods can tilt from a ninety-degree (vertical) orientation to a thirty degree orientation with the use of a single handle, which the user pulls or pushes.

Due to its compact design the device will minimize storage requirements. For instance, the twelve-rod example requires 624 (six hundred and twenty-four) square inches of storage. The current device uses much less space than the current devices in the market; the current device will occupy approximately one-half the space that is required for the prior art reference, Arrazola. The device weighs less than twenty pounds and can be easily lifted, using the lifting handles, by one person, fully loaded into a truck bed, SUV or boat without the risk of contact with the vehicle and possible damage to the rods.

The lifting handles serve a dual purpose: to enable a person to lift and carry the device and provide a caging frame to protect the reels. The handles that are made as a part of the device permits the person to easily lift the entire device. Because of the exposure to extremes in weather and likely exposure to salt the device is made from non-corrosive material. The choice of non-corrosive material will enable the user to easily clean the rods while in the holder.

When the rods are in the holders the rod tips will all move together and in the same, single direction, so the user need only manage one point of contact. In this configuration with all the rod and reel combinations pointing in one direction the device enables transportation in the back of vehicles (with rod tips appropriately pointing towards the rear of the vehicle) and clearing truck and SUV lift gate(s) while tilted below the clearance level of the car.

This device will allow the transport of many fishing rods to and from a garage to a vehicle to a fishing boat and vice versa. It is not unusual to spend $300 to more than $1,000 on a single rod and it is important that the tips of the rods as well as the reels, eyelets (line guides) and lines remain in proper configuration and do not contact other objects or each other to prevent damage. A fishing rod can be anywhere from six to ten feet in length and that makes safe transport a challenge.

It is common practice to rig each fishing rod/reel for one particular species of fish or type of fishing method that may be encountered on a trip and then take multiple rigged fishing rods on a fishing trip, including back up rods as re-rigging rods while fishing is neither practical nor desirable. This is especially true when fishing from a boat. Typically, the owner of a rod would transport each rod by hand from the garage or storage area to the vehicle and then from the vehicle to the boat and in reverse after the boat is docked, adding a step to wash or rinse each rod before storage. This continuous handling of each fishing rod lends itself to possible damage to the rods. Additionally, rods cannot stand by themselves and should not be laid down on the ground or leaned against other objects as any contact to a fishing rod, other than by its handle can potentially damage the rod or reel.

With the current application the owner of the rods would place the rods in the rod holders. The drawings themselves depict twelve possible rod holders although fewer or more rods can be placed in this device, and fewer or more rod holders can be configured on the device.

The device will have four wheels as well as a handle as well as vertical and horizontal members to complete a frame. The wheels are selected to traverse many different surfaces.

One of the primary challenges is to ensure that the rod tips are not damaged during transport. This device will allow the rods to be tilted to an angle of approximately 30° from the ground. In the case of a ten-foot rod, the rod's height is shortened to slightly less than six feet and this will allow the tips of the rods to safely enter through door area without danger of the tips of the rods hitting the door frame, ceiling, hanging lights, etc.

A slider bar handle is attached to a slider bar which is in turn attached to the rod holders. Rod holders move in unison and simultaneously as each is tilted in the same direction. This uniform tilt would allow the rods to tilt but without any risk of damage to the rods themselves.

NUMBERING REFERENCES

Figure 1:
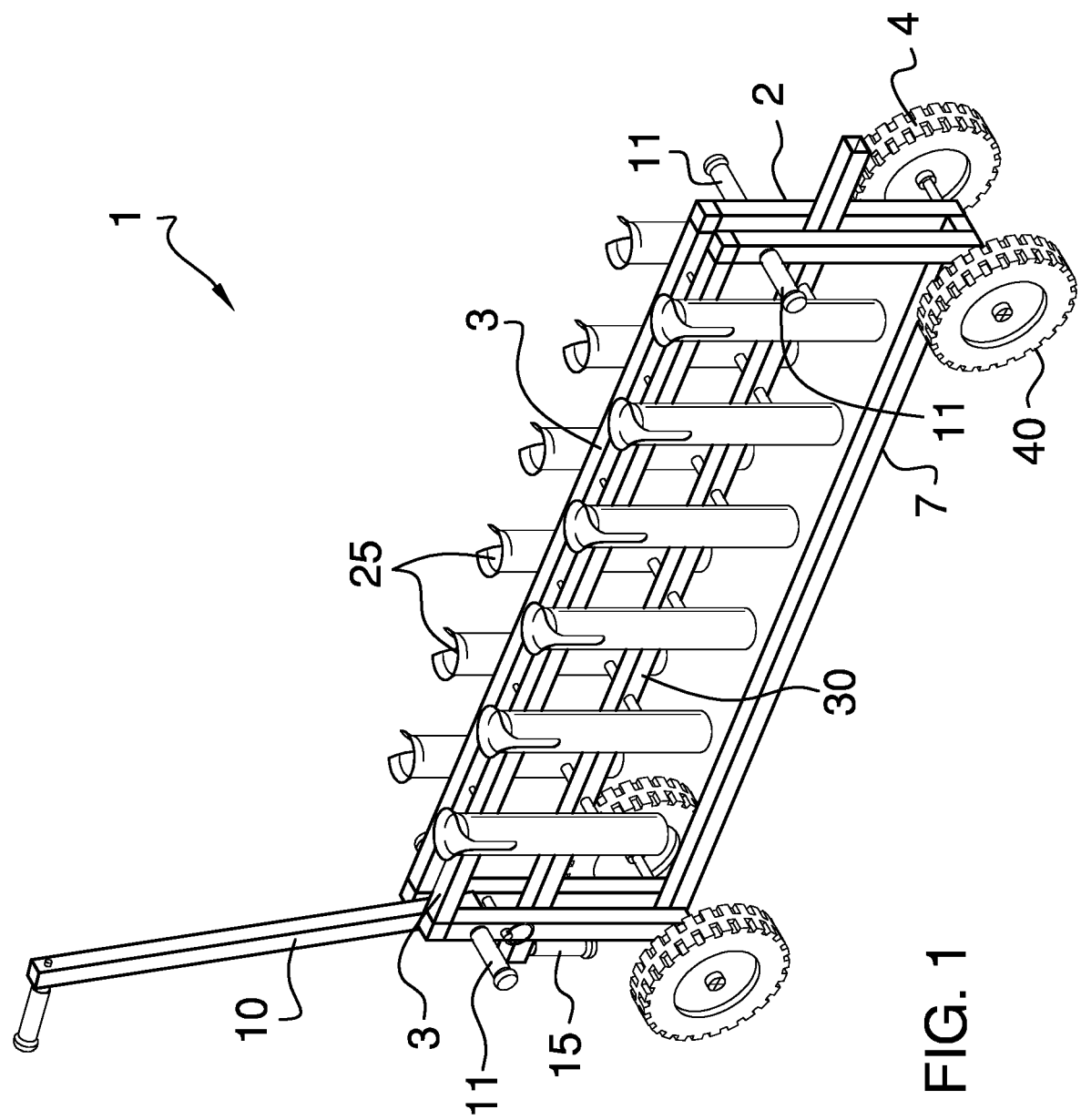
FIG. 1 is an isometric view of the device.
Figure 2:
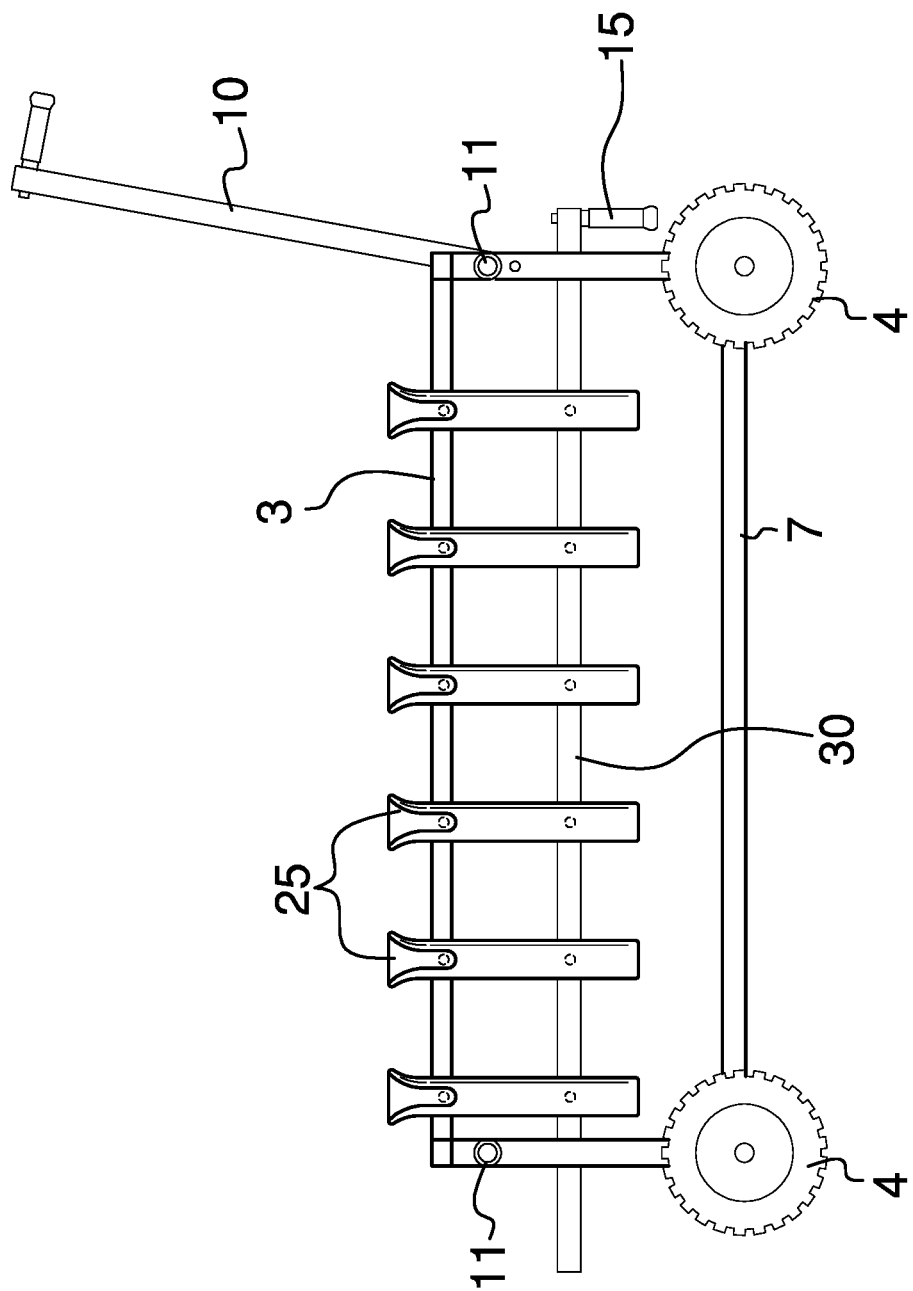
FIG. 2 is a side view of the device.

1—Device
2—Vertical Member
3—Upper horizontal member
3A—upper connection point for the rod holder
4—Wheels 7—Lower horizontal member
10—Handle
11—Lifting handle
15—Slider Bar Lever
25—Rod holder
30—Slider bar
30—Through holes
30A—Lower connection point for the rod holder

DETAILED DESCRIPTION OF THE EMBODIMENTS

The device 1 allows the user to transport many fishing rods and reels to and from the storage area indoors to a truck or SUV and then again to the boat without danger of damage to the fishing rod and reel. The device as depicted in the Figures allow the transport of twelve rods but fewer or more rods can be transported safely, easily and effectively as the device can be configured with more or fewer rod holders by changing only the length of the device. Additionally, the device comprises marine grade materials so the users can store, transport, rig and wash rods without removing them from the device.

A frame structure is provided. The frame structure is comprised of two upper horizontal members 3 that extend from the handle 10 to the end of the frame. A bottom horizontal member 7 provides structure to the frame. Wheels 4 are provided to allow the user to push or pull the rods over different types of terrain. Separate lifting handles 11 are positioned on the frame to lift the device.

Two pair of vertical members 2 secure the bottom horizontal member to the upper horizontal members 3.

A slider bar 30 extends from the handle 10 to the end of the frame. The slider bar 30 is positioned between the pair of upper horizontal members 3 and the lower horizontal member 7 that is part of the frame. A slider bar lever 15 is placed on one end of the slider bar in the proximate area of the handle 10.

Figure 3:
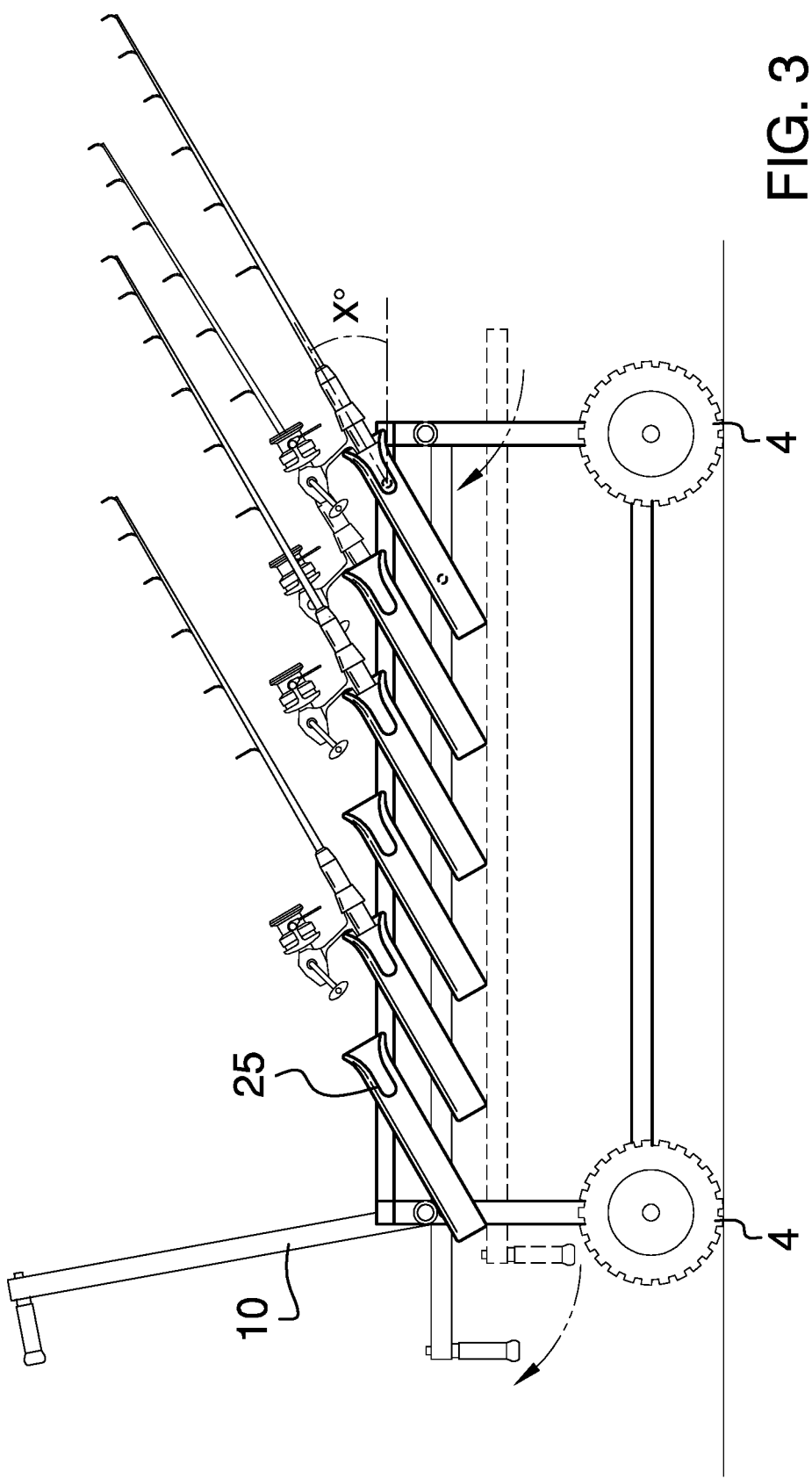
FIG. 3 is an in-use view of the device.
Figure 4:
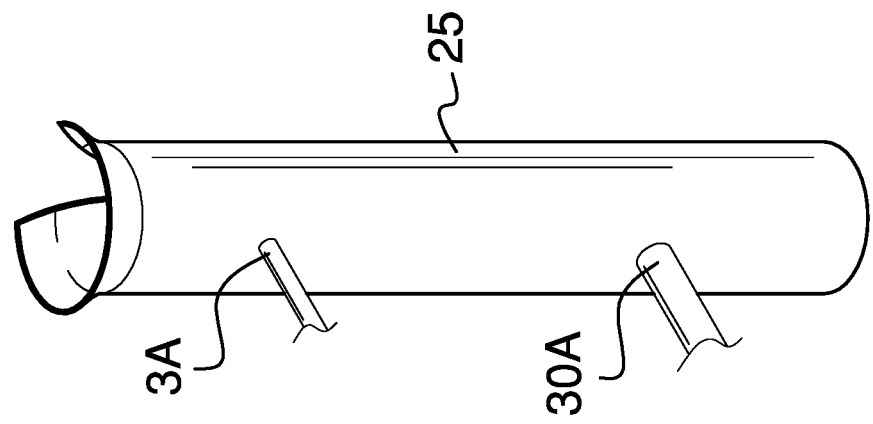
FIG. 4 is a detailed view of the connection points of the upper horizontal member and the slider bar to the rod holder.

A plurality of rod holders 25 is secured to the upper horizontal member and the slider bar at the connection points, 3A and 30A. The connection points, 3A and 30A, permit the rod holders 25 to rotate as the user pulls back on the slider bar lever 15. The angle of maximum tilt of the rod holder is 30 degrees from the horizontal plane, which is represented by "X degrees" on FIG. 3. This in effect makes the vertical clearance of a ten feet rod to slightly less than six feet at the maximum thirty-degree angle.

With the reduced clearance when the fishing rods are tilted, the plurality of rods can successfully navigate a six foot clearance without any danger of the tip of the rod hitting the ceiling of the storage structure. Once the rods are safely indoors the rods can then be tilted upward, if desired, to minimize the footprint of the device.

While the embodiments of the invention have been disclosed, certain modifications may be made by those skilled in the art to modify the invention without departing from the spirit of the invention.

The inventor claims:

1. A mobile articulating rod holder that is comprised of:
   a) a frame;
   wherein the frame comprises a plurality of upper horizontal support members, a lower horizontal support member, and a plurality of vertical support members;
   wherein a first pair of vertical support members from said plurality of vertical support members are provided on a first end of the frame;
   wherein a second pair of vertical support members from said plurality of vertical support members are provided on a second end of the frame;
   b) a plurality of wheels;
   c) a handle;
   d) a plurality of lifting handles;
   e) a slider bar;
   wherein the slider bar is horizontal;
   wherein the slider bar is positioned proximate to the handle;
   f) a slider bar handle;
   wherein the slider bar handle is affixed to one end of the slider bar;
   wherein the slider bar handle moves horizontally;
   g) a plurality of rod holders;
   wherein the plurality of rod holders is secured to the upper horizontal support members;
   wherein the plurality of rod holders is secured to the slider bar;
   wherein the plurality of rod holders rotates with a movement of the slider bar;
   h) a plurality of connection pieces; wherein the plurality of connection pieces attaches the rod holders to the upper horizontal support members.

2. The mobile articulating rod holder as described in claim 1, wherein the plurality of rod holders rotate between thirty degrees and ninety degrees relative to a horizontal plane.

\* \* \* \* \*